Aug 5, 1941.　　I. H. JUDD ET AL　　2,251,358
SKID ASSEMBLY
Filed April 8, 1940　　3 Sheets-Sheet 1
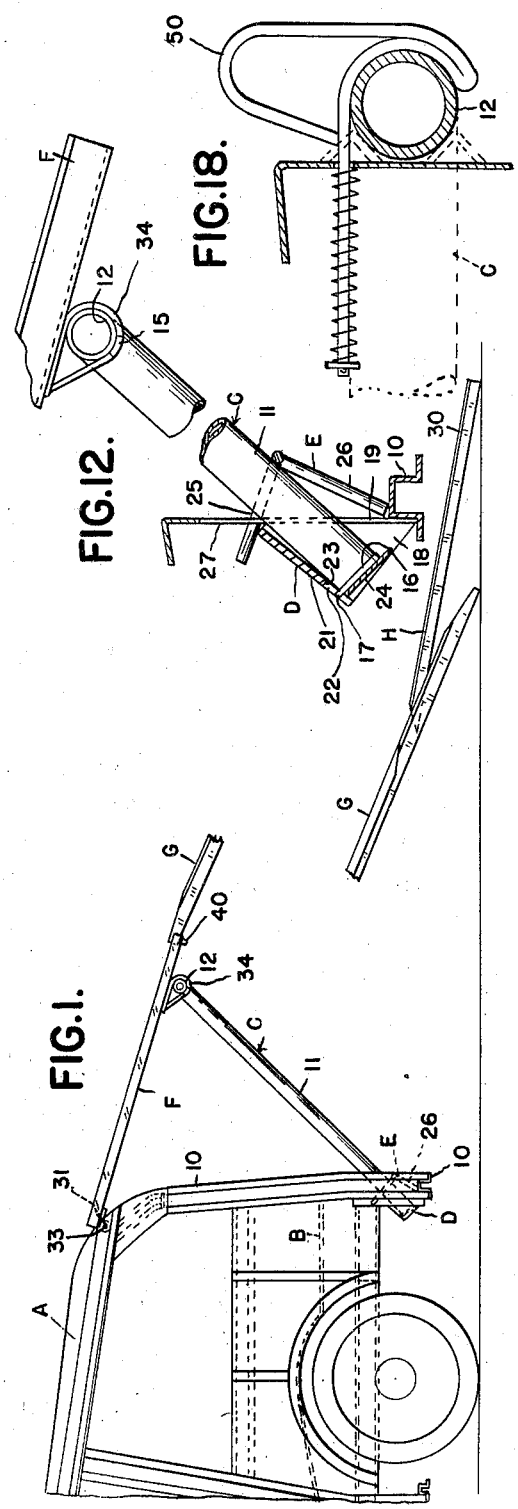
INVENTORS
IRVING H. JUDD
WILLIAM E. BAKER
BY
ATTORNEYS Aug 5, 1941.   I. H. JUDD ET AL   2,251,358
SKID ASSEMBLY
Filed April 8, 1940   3 Sheets-Sheet 2
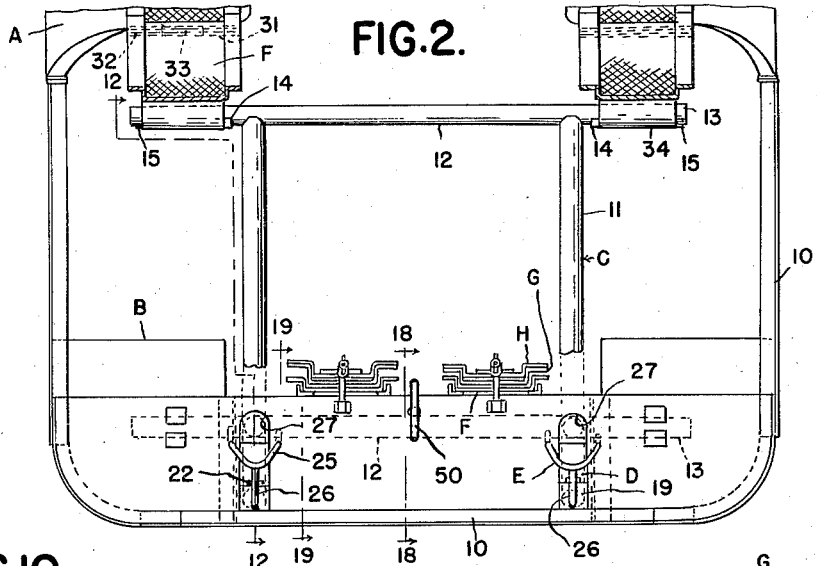
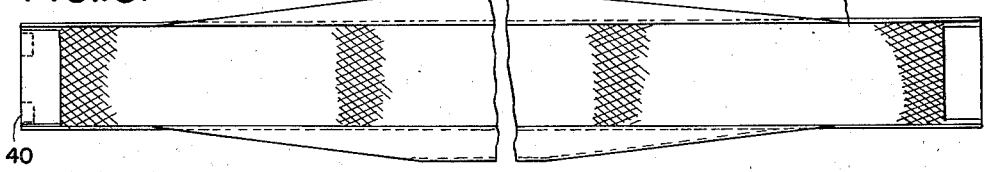
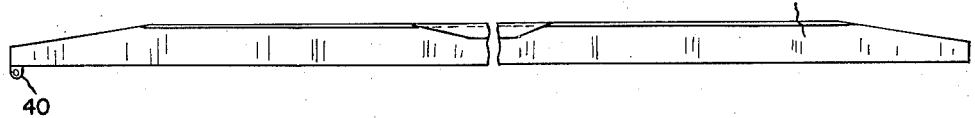
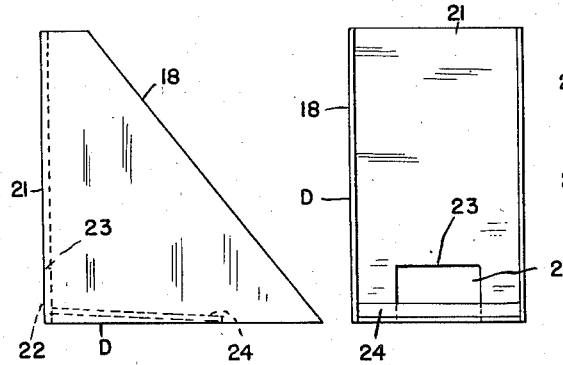
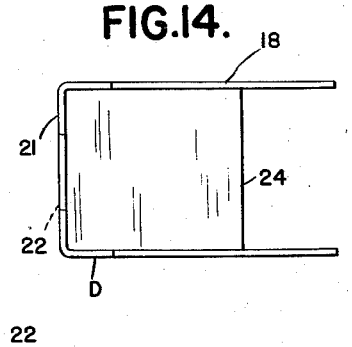
INVENTORS
IRVING H. JUDD
WILLIAM E. BAKER
BY
ATTORNEYS Aug 5, 1941.  I. H. JUDD ET AL  2,251,358
SKID ASSEMBLY
Filed April 8, 1940  3 Sheets-Sheet 3
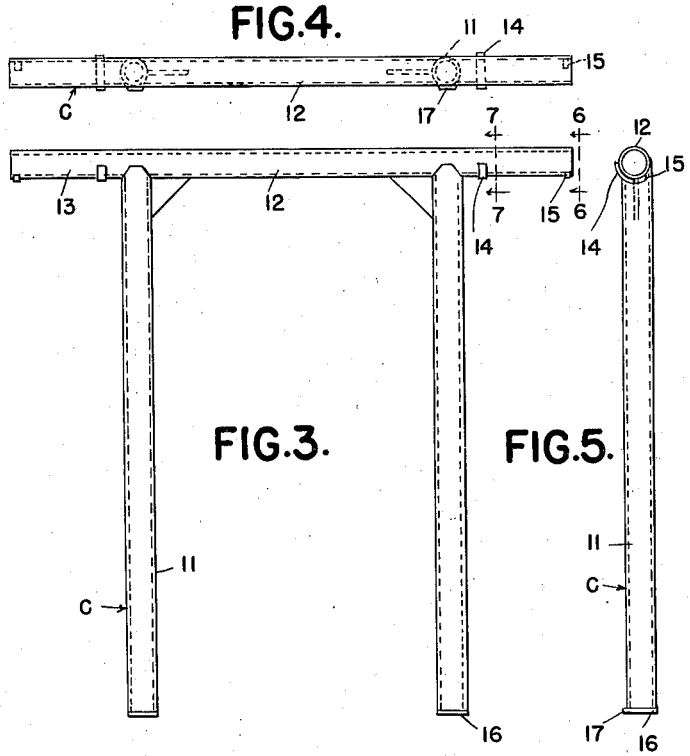
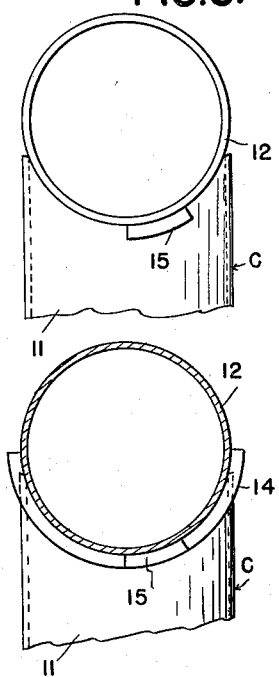
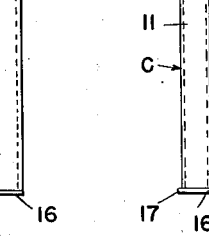
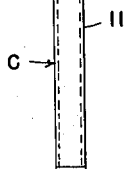
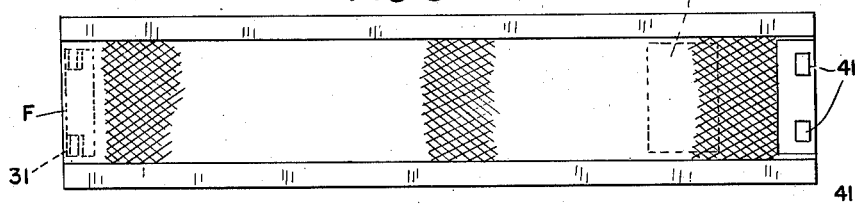
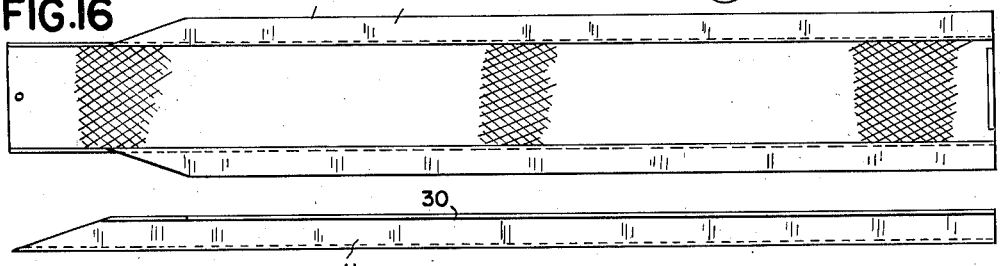
INVENTORS
IRVING H. JUDD
WILLIAM E. BAKER
BY
ATTORNEYS Patented Aug. 5, 1941

2,251,358

UNITED STATES PATENT OFFICE 2,251,358

SKID ASSEMBLY

Irving H. Judd, Norfolk, Va., and William E. Baker, Detroit, Mich., assignors to Whitehead & Kales Company, River Rouge, Mich., a corporation of Michigan Application April 8, 1940, Serial No. 328,586

30 Claims. (Cl. 214—85)

This invention relates generally to skid assemblies for use with motor vehicle transports and refers more particularly to those designed for use with carry car trailers of the two deck type.

Heretofore skids have been used in pairs or sets to form an inclined runway from the upper or lower deck of a carry car trailer to the ground to facilitate the loading and unloading of motor vehicles such as automobiles, trucks and the like. Usually such skids were reenforced or flanged channels of sufficiently heavy gage metal to carry the weight of the motor vehicle being loaded or unloaded, and were of such length that they could be disposed at the proper angle to permit the motor vehicle being loaded or unloaded to travel over the skid to and from the decks of the transport or trailer without striking any part of the transport or skid at the junction therebetween. Thus, such skids were long, heavy and cumbersome devices that were hard to handle. Ordinarily it was very difficult for one man to lift them and to store them properly out of the way while not in use. Moreover, when skids are supported from the ground relatively cumbersome and awkward bracing is required to provide security, especially if the trailer should move slightly when cars are being loaded or unloaded.

In the present instance, the objections to the previous skid structures have been overcome entirely by the provision of an assembly that can be conveniently handled by one man. Moreover, our construction has many advantages. For example, shorter and lighter skids may be used. Thus, less lifting effort is required and they may be more easily handled. Provision is made for storing out of the way in the trailer the entire skid assembly when not in use. In our construction the weight of the motor vehicle being loaded or unloaded is not carried by the skids alone as heretofore, but is carried through a skid support or brace that is adjustable at will relative to the trailer from an operative upwardly and rearwardly inclined supporting position to a horizontal inoperative position beneath the lower deck of the trailer. When in the inclined position mentioned the support cooperates with the forward skid sections and the rear end of the trailer to provide a substantially triangular carrier for the motor vehicle being loaded or unloaded. When in the horizontal position, the legs of the support are carried beneath the lower deck of the trailer so that the crossbar of the support may be located close to and across the rear end of the trailer. Thus, the support may in the present instance be conveniently stored in an out of the way place ready for immediate use.

To facilitate assembly or disassembly of the skid structure the support is preferably provided with portions that serve as connections for the forward sections of the skids when they are to be assembled with the upper deck of the trailer in the operative loading or unloading position.

Another feature which is preferably employed is the provision of open pockets at the rear end of the trailer for receiving and supporting the legs of the skid support when the latter is in operative skid supporting position. In conjunction with these pockets there are stirrups that serve as guides for the legs of the support when such legs are moved to and from the pockets and that serve to hold the skid support in the correct position while the forward skid sections are being assembled. The intermediate and rear skid sections may be readily connected to or disconnected from the forward skid sections when the latter are in the operative position mentioned. Thus, a very practical knockdown structure has been provided.

Other objects, advantages and novel details of construction of this invention will be made more apparent as this description proceeds, especially when considered in connection with the accompanying drawings, wherein:

Figure 1 is a fragmentary side elevation of a trailer and showing a skid structure embodying our invention applied thereto;

Figure 2 is a rear elevation of the trailer showing the support C and the forward skid sections F in operative position;

Figure 3 is a detail view of the support;

Figure 4 is a plan view of the structure shown in Figure 3;

Figure 5 is an end elevation of the structure shown in Figure 3;

Figure 6 is a sectional view taken on the line 6—6 of Figure 3;

Figure 7 is a sectional view taken on the line 7—7 of Figure 3;

Figure 8 is a plan view of one of the forward skid sections;

Figure 9 is an edge elevation of the skid section shown in Figure 8;

Figure 10 is a plan view of one of the intermediate skid sections;

Figure 11 is an edge elevation of the skid section shown in Figure 10;

Figure 12 is a sectional view on the line 12—12 of Figure 2;

Figure 13 is a side elevation of one of the pockets;

Figure 14 is a top plan view of the structure shown in Figure 13;

Figure 15 is a rear elevation of the structure shown in Figure 13;

Figure 16 is a detail top plan view of the rear skid section;

Figure 17 is an edge elevation thereof;

Figure 18 is a sectional view on the line 18—18 of Figure 2;

Figure 19 is a sectional view on the line 19—19 of Figure 2;

Figure 20 is a fragmentary vertical sectional view through the trailer and showing the support C in stored position.

Referring now to the drawings, A and B, respectively, are the upper and lower decks of a carry car trailer, C is the support or brace, D are the supporting pockets, E are the support guides, and F, G and H, respectively, are the forward, intermediate and rear skid sections of a skid assembly embodying our invention.

As shown, the upper and lower decks A and B are in the form of tracks or runways for the motor vehicles (not shown) to be carried and are supported by suitable framework 10 in proper spaced relation to each other.

The support C is preferably U-shape in configuration and is formed of tubing. As shown, the legs 11 of the U are substantially parallel and are rigidly secured to the crossbar 12 of the U intermediate its end so as to provide at the outer sides of said legs suitable laterally extending portions 13 for connection with the forward skid sections F. If desired, retaining flanges 14 and 15, respectively, may be provided on these skid connections at spaced points thereof to limit sliding movement of the forward skid sections F relative thereto. The free ends of the legs 11 are preferably provided with diametrically extending bars 16 that project slightly beyond the surface of the legs at one side thereof to provide lugs 17.

The pockets D for receiving the free ends of the legs 11 of the support are carried by the trailer at the rear end thereof just below the lower deck B, and comprise channel-shaped members 18 securely welded to the framework 10 of the trailer in front of suitable openings 19 therein (see Figure 12) for the reception of said legs. In each front wall 21 of the pockets is an opening 22 for receiving the lugs 17 on the lugs 11 of the support, while between and securely welded to opposite sides of the pockets in spaced relation to the upper edges 23 of the openings are seats 24 for the lower ends of the legs of the support. Thus, when the lugs 17 on the legs 11 of the support are in engagement with the openings 22 in the front walls 21 of the pockets, a safety lock is provided to prevent any possibility of the legs 11 coming out of the pockets when the support C and skid sections are in operative loading or unloading position.

The stirrup-like guides E for the legs 11 of the support are just in rear of the pockets and preferably have substantially U-shaped portions 25 and depending legs 26. As shown the U-shaped portions 25 open toward and are secured to the framework 10 of the trailer, while the depending legs 26 extend down from the bases of the U's and are secured to the framework 10 of the trailer so as to serve effectively as braces for the U-shaped portions 25.

Located above the pockets B but below the lower deck B are upward extensions 27 of the openings 19 for receiving the legs 11 of the support when the latter is not in use. In front of these openings 27 and carried by the framework 10 of the trailer are suitable substantially horizontal supports 28 for the legs 11 when in this position.

The skid sections F, G and H provide a suitable inclined runway from the upper deck A of the trailer to the ground, and preferably comprise relatively light gage sheet metal stampings of channel configuration having laterally extending reenforcing flanges 30.

In the present instance, the forward skid sections F span the space between and rest upon the upper deck A and the skid connections 13 of the support. Such sections are provided at their forward ends with depending lugs 31 that extend through holes 32 in the upper deck A and are held against displacement by removable pins 33 that are located beneath the deck A and extend through said lugs 31. Adjacent their rear ends the forward skids F have strap-like attaching loops 34 that fit upon the laterally extending portions 13 of the support C.

The intermediate sections G nest within the forward sections F and are provided at their forward ends with depending lugs 40 that are received in holes 41 in the forward sections F. Pins located beneath the sections F extend through these lugs 40 and hold the intermediate sections G against displacement. The rear ends of the intermediate skid sections rest upon the ground.

The rear skid sections H nest within the intermediate skid sections G and rest upon the ground. These sections H make less abrupt the angle between the intermediate skid sections G and the ground. If desired, the rear sections H may be secured at their forward ends to the intermediate sections G.

In use, the legs 11 of the support C may be moved from the horizontal inoperative position to the inclined position by simply sliding such legs rearwardly until the free ends thereof are opposite the pockets D. The crossbar 12 may then be raised so that the legs 11 may enter the pockets D. The attaching loop 34 of one of the forward sections F may then be assembled with one of the laterally extending portions 13 of the support C and to the rear end of the upper deck A of the trailer. In this connection it will be appreciated that the lugs 31 at the forward ends of the skid sections F are inserted into the holes 32 in the upper deck A and are held against displacement by inserting the pins 33 through such lugs after they are in place. The other forward skid section F may then be applied in a similar manner to the support C and upper deck and fastened to the latter. The intermediate skid sections G are then applied and secured to the forward sections F. Following this, the rear sections H are applied to the intermediate sections G. The structure is then ready for loading or unloading purposes. The motor vehicles (not shown) to be loaded are driven up the skids H, G and F onto the upper deck A or from the latter down the skid sections as the case may be.

When loading or unloading of the upper deck A is completed, the order of assembly just mentioned is reversed to knock down the skid structure. When the support C has been restored to its inoperative horizontal position beneath the lower deck B, the support may be retained in such position by simply turning over onto the crossbar 12 of the support a spring pressed clamp 50 carried by the framework 10 of the trailer at the rear end thereof. The skid sections F, G and H may be nested in the lower deck B or in any other suitable part of the trailer, as desired.

Thus, from the foregoing, it will be apparent that one of the most important features of our invention is the use of the forward skid sections F as a connection from the rear end of the upper deck of the two-deck trailer to a support or brace such as C after the latter has been moved from an inoperative position to an operative position as aforesaid. The connections between the skid sections F and support C may, of course, vary and while we have shown and described one embodiment thereof, it is apparent that we may use any suitable connections within the scope of our invention. The idea of supporting the forward sections F of the skids from the trailer rather than from the ground is of utmost importance. Other features such as the pockets D, stirrups E, etc., are also desirable and cooperate with the other features and parts mentioned to provide an efficient structure.

What we claim as our invention is:

1. A knockdown skid assembly comprising a load carrying member and a skid, the member being engageable in an upwardly and rearwardly inclined position with a pocket in a trailer and having a laterally extending portion, the skid being of sufficient length to span the space between the member and an upper deck of the trailer, said skid being removably mounted on the laterally extending portion and attachable to the upper deck of the trailer.

2. In a skid assembly, the combination with a trailer having upper and lower decks and a supporting framework therefor, of a pair of laterally spaced pockets carried by said framework adjacent the lower deck and opening upwardly and rearwardly relative thereto, an inverted substantially U-shaped brace having the legs of the U detachably received in said pockets, the crossbar of the U having lateral extensions, and skid sections mounted on said lateral extensions and detachably connected to the upper deck.

3. In a skid assembly, the combination with a trailer having upper and lower decks and a supporting framework therefor, of a pair of laterally spaced pockets carried by said framework adjacent the lower deck and opening upwardly and rearwardly relative thereto, an inverted substantially U-shaped brace having the legs of the U detachably received in said pockets, the crossbar of the U having lateral extensions, and skid sections having attaching portions removably mounted on said lateral extensions and having other portions detachably connected to the upper deck.

4. In a skid assembly, the combination with a trailer having upper and lower decks and a supporting framework therefor, of a pair of laterally spaced pockets carried by said framework adjacent the lower deck and opening upwardly and rearwardly relative thereto, an inverted substantially U-shaped brace having the legs of the U detachably received in said pockets, the crossbar of the U having lateral extensions, skid sections mounted on said lateral extensions and detachably connected to the upper deck, and ground-engaging skid sections detachably mounted on the skid sections aforesaid.

5. In a skid assembly, the combination with a trailer having upper and lower decks and a supporting framework therefor, of a pair of laterally spaced pockets carried by the framework beneath the lower deck at the rear end of the trailer, said pockets opening upwardly and rearwardly, a pair of skid sections detachably connected to and projecting rearwardly from the upper deck, said skid sections being provided on the underside thereof with attaching portions, and a load carrying brace extending upwardly and rearwardly from said pockets to said skid sections and having portions detachably engaging said attaching portions, said brace being removable from the pockets to a substantially horizontal position beneath the lower deck, and means carried by the framework for supporting the brace in such horizontal position.

6. In a skid assembly, the combination with a trailer having upper and lower decks and a supporting framework therefor, of a pair of laterally spaced pockets carried by the framework beneath the lower deck at the rear end of the trailer, said pockets opening upwardly and rearwardly, a pair of skid sections detachably connected to and projecting rearwardly from the upper deck, said skid sections being provided on the underside thereof with attaching portions, and a load carrying brace extending upwardly and rearwardly from said pockets to said skid sections and having portions detachably engaging said attaching portions, said brace being removable from the pockets to a substantially horizontal position beneath the lower deck, and guides for the brace carried by the framework adjacent said pockets.

7. In a skid assembly, the combination with a trailer having upper and lower decks and a supporting framework therefor, of a pair of laterally spaced pockets carried by the framework beneath the lower deck at the rear end of the trailer, said pockets opening upwardly and rearwardly, a pair of skid sections detachably connected to and projecting rearwardly from the upper deck, said skid sections being provided on the underside thereof with attaching portions, and a load carrying brace extending upwardly and rearwardly from said pockets to said skid sections and having portions detachably engaging said attaching portions, said brace being removable from the pockets to a substantially horizontal position beneath the lower deck, means carried by the framework for holding the brace in such horizontal position.

8. In a skid assembly, a trailer having upper and lower decks, a pocket carried by the trailer at its rear end adjacent the lower deck, a brace having a leg inserted into said pocket and having a lateral projection at its upper end, and a skid provided at its forward end with means for attachment to the upper deck of the trailer and provided at its rear end with means for attachment to the lateral projection.

9. In a skid assembly, a trailer having upper and lower decks, a pocket carried by the trailer at its rear end adjacent the lower deck, a brace having a leg inserted into said pocket and having a lateral projection at its upper end, and a skid provided at its forward end with means for attachment to the upper deck of the trailer and provided at its rear end with a loop for detachably receiving the lateral projection.

10. In a skid assembly, a trailer having upper and lower decks, skids connected to the upper deck and extending downwardly and rearwardly therefrom, a common brace for the skids connected thereto at their lower rear ends, supporting pockets for the brace carried by the trailer adjacent the lower deck, and safety locks associated with the pockets for preventing accidental withdrawal of the brace from the pockets while the brace is in operative position for supporting the skids.

11. In a skid assembly, a trailer having upper and lower decks and provided just below the lower deck with upwardly and rearwardly opening pockets, said trailer also having openings just above the pockets, skids projecting downwardly and rearwardly from the upper deck, and a brace engageable with the pockets for operatively supporting the skids and movable through the openings to an inoperative position beneath the lower deck.

12. In a skid assembly, the combination with a trailer having upper and lower decks, of skids connected to the upper deck so as to constitute downward and rearward extensions thereof, upwardly opening pockets carried by the lower deck, and supporting means for said skids including a brace adjustable from an operative position inclining upwardly and rearwardly from the interior of said pockets to an inoperative substantially horizontal position beneath said lower deck.

13. In a skid assembly, the combination with a trailer having upper and lower decks, of upwardly opening pockets carried by the trailer adjacent the lower deck, skids connected to the upper deck so as to constitute downward and rearward extensions thereof, supporting means for said skids including a brace movable to and from supporting engagement with the pockets, and stirrups for said brace adjacent the pockets operable as guides for the brace during movement thereof to and from the pockets.

14. A skid assembly of the class described comprising a brace movable from an inoperative substantially horizontal position beneath the lower deck of a two-deck trailer to an upwardly and rearwardly inclined operative bracing position at the rear end of such trailer, upwardly opening pockets at the rear end of the trailer adjacent the lower deck for removably receiving portions of said brace, and skid sections detachably connected to said brace at the upper end thereof and attachable to the upper deck of the trailer.

15. A knockdown skid assembly of the class described comprising a brace having its lower end engageable with an upwardly opening supporting pocket of a trailer and provided at its upper end with a laterally extending portion, and a skid section removably sleeved on the laterally extending portion of the brace and attachable to an upper deck of the trailer.

16. A skid assembly of the class described comprising an inverted substantially U-shaped brace and a pair of skid sections, the legs of the U being engageable with a supporting pocket in a trailer, opposite ends of the crossbar of the U extending laterally beyond the legs of the U, and the skid sections being detachably mounted on said lateral extensions and being attachable to an upper deck of the trailer.

17. A skid assembly comprising a brace having legs insertable into supporting pockets at the rear end of a trailer and having lateral projections at its upper end, and skid sections provided at their forward ends with lugs attachable to an upper deck of a trailer and having loop portions at their rear ends detachably mounted on said lateral projections.

18. A knockdown skid assembly comprising an inverted substantially U-shaped brace, the legs of the U being insertable into upwardly opening supporting pockets at the rear end of a trailer, the base of the U having lateral extensions, and skid sections having portions removably mounted on the lateral extensions of said brace and having other portions attachable to an upper deck of the trailer.

19. In a skid assembly, the combination with a trailer having upper and lower decks, of upwardly opening pockets carried by the trailer adjacent the rear end of the lower deck, skids detachably connected to and extending rearwardly from the upper deck, an upwardly and rearwardly inclined brace removably connected to the skids at their rear ends and having portions removably inserted into said pockets, and means beneath the lower deck in advance of said pockets for supporting the brace when removed from said skids and said pockets.

20. In a skid assembly, the combination with a trailer having upper and lower decks, of skids detachably connected to and projecting rearwardly from the upper deck, upwardly opening pockets carried by the tractor adjacent the rear end of the lower deck, a brace for said skids having portions inserted into said pockets, and stirrup-like guides for the portions just mentioned of said brace adjacent the pockets and secured to said trailer.

21. In a skid assembly, the combination with a trailer having upper and lower decks, of skids detachably connected to and projecting rearwardly from the upper deck, upwardly opening pockets carried by the tractor adjacent the rear end of the lower deck, said trailer being provided adjacent the pockets with openings, a brace for said skids having portions alternately insertable into said pockets and openings, and guide means for said portions carried by the trailer adjacent the pockets and openings.

22. In a skid assembly, the combination with a trailer having a frame and upper and lower automobile carrying decks carried by said frame, of an upwardly opening supporting pocket rigid with the trailer frame adjacent the lower deck, a brace freely and removably supported in and projecting upwardly and rearwardly from said pocket, and a skid section spanning the space between and detachably connected to said brace and the upper deck of said trailer.

23. In a skid assembly, the combination with a trailer having a frame and upper and lower automobile carrying decks carried by said frame, of an upwardly opening pocket rigid with said trailer frame adjacent the lower deck, a brace freely and removably mounted in the pocket and extending upwardly and rearwardly relative to said lower deck, and a skid section spanning the space between the upper deck and brace, said skid section being detachably secured to the upper deck and to said brace.

24. In a skid assembly, the combination with a trailer having a frame and upper and lower automobile carrying decks carried by said frame, of a skid section detachably connected to the upper deck, and a load carrying support for said skid section freely and rearwardly carried by said frame adjacent the lower deck.

25. In a skid assembly, the combination with a trailer having a frame and upper and lower automobile carrying decks carried by said frame, of a skid section detachably connected to the upper deck, and an upwardly and rearwardly inclined load carrying brace for said skid section freely and removably supported from the frame adjacent the lower deck, the free ends of the skid section and support therefor being detachably connected together.

26. In a skid assembly, a trailer having a frame and upper and lower automobile carrying decks carried by said frame, a brace freely and removably supported from the rear end of the trailer frame adjacent the lower deck and inclining upwardly and rearwardly therefrom, and a skid spanning the space between and detachably connected to the brace and to the upper deck of the trailer.

27. In a skid assembly, a trailer having a frame and upper and lower automobile carrying decks carried by said frame, an upwardly opening pocket rigid with the trailer frame at its rear end adjacent the lower deck, a brace having a leg inserted freely into said pocket and inclining upwardly and rearwardly therefrom, and a skid provided at its forward end with means for attachment to the upper deck of the trailer and provided at its rear end with means for attachment to the brace at its upper end.

28. In a skid assembly, a trailer having a frame and upper and lower automobile carrying decks carried by said frame, skids connected to the upper deck and extending downwardly and rearwardly therefrom, a brace detachably connected to said skids at their lower rear ends, and upwardly opening supporting pockets rigid with the trailer frame adjacent the lower deck and removably receiving portions of said brace.

29. In a skid assembly, the combination with a trailer having a frame and upper and lower automobile carrying decks carried by said frame, of upwardly opening pockets rigid with the trailer frame adjacent the lower deck, skids connected to the upper deck so as to constitute downward and rearward extensions thereof, and supporting means for said skids including a brace removably received in said pockets and connected to said skids.

30. In a skid assembly, the combination with a trailer having a frame and upper and lower automobile carrying decks carried by said frame, of an upwardly opening pocket rigid with said frame adjacent the lower deck, a brace removably inserted into said pocket, and a skid section detachably connected to the brace and to the upper deck of the trailer.

IRVING H. JUDD.
WILLIAM E. BAKER.